United States Patent [19]

Langenfeld et al.

[11] Patent Number: 4,725,189
[45] Date of Patent: Feb. 16, 1988

[54] REAR-MOUNTED LOADER BUCKET FOR A TRACTOR INCLUDING ROLL-BACK MEANS

[75] Inventors: Joseph W. Langenfeld; Neal W. Westendorf, both of Onawa, Iowa

[73] Assignee: Westendorf Mfg. Co., Inc., Onawa, Iowa

[21] Appl. No.: 907,061

[22] Filed: Sep. 15, 1986

[51] Int. Cl.⁴ ............................................. B66F 9/00
[52] U.S. Cl. ..................................... 414/703; 414/715
[58] Field of Search ............... 414/703, 706, 707, 708, 414/715

[56] References Cited

U.S. PATENT DOCUMENTS

| | | | |
|---|---|---|---|
| 3,187,912 | 6/1965 | McKnight | 414/703 |
| 3,198,357 | 8/1965 | Shelby | 414/703 |
| 3,199,693 | 8/1965 | Schedeen | 414/703 X |
| 3,368,706 | 2/1968 | Vaalimaa et al. | 414/703 |
| 3,468,442 | 9/1969 | Sarvela et al. | 414/703 |
| 3,529,740 | 9/1970 | Chant | 414/715 X |
| 3,872,991 | 3/1975 | Pasideris et al. | 414/715 X |
| 3,884,378 | 5/1975 | Muellner et al. | 414/706 |
| 3,912,092 | 10/1975 | Bolton et al. | 414/703 X |
| 4,358,241 | 11/1982 | Anderson | 414/703 |

*Primary Examiner*—Robert J. Spar
*Assistant Examiner*—Donald W. Underwood
*Attorney, Agent, or Firm*—Zarley, McKee, Thomte, Voorhees & Sease

[57] ABSTRACT

A loader bucket comprising a bucket support frame which is connected to the three-point hitch assembly located at the rear of a conventional tractor. The bucket support frame comprises a pair of side frame members which are pivotally connected to the rearward ends of the lower links arms of the hitch assembly. The frame also includes a vertically disposed post which has a bracket pivotally mounted at the upper end thereof. The forward end of the bracket is pivotally secured to the rearward end of the upper link arm of the hitch assembly. A pair of hydraulic cylinders are pivotally connected at one end thereof to the rearward end of the bracket and have their other ends operatively connected to a horizontally disposed shaft which is rotatably mounted on the bucket support frame. The loader bucket is pivotally mounted on the bucket support frame and is connected to the rotatable shaft by a linkage whereby extension and retraction of the hydraulic cylinders causes the bucket to be pivotally moved relative to the frame. The hydraulic cylinders permit the bucket to be maintained in a level condition, rolled back, or moved to a dumping position.

6 Claims, 10 Drawing Figures

REAR-MOUNTED LOADER BUCKET FOR A TRACTOR INCLUDING ROLL-BACK MEANS

BACKGROUND OF THE INVENTION

This invention relates to a loader bucket for a tractor and more particularly to a loader bucket mounted on the three-point hitch at the rearward end of the tractor.

Many different types of loader buckets have been mounted on the three-point hitch assembly normally located at the rear of the tractor. The conventional three-point hitch assembly on the tractor normally includes a pair of lower link arms and an upper link arm. The lower link arms are normally raised and lowered by some sort of internal gear arrangement or hydraulic cylinder arrangement provided on the tractor.

It is very important that it is possible to either maintain the bucket in a level condition as it is being raised from the ground or to tip back (roll back) the loader as desired to prevent material from falling from the open rearward end thereof. Some means must also be provided for dumping the bucket when the bucket has been positioned at the desired height. The conventional rear-mounted loader bucket normally includes at least one hydraulic cylinder for rolling back the loader bucket as well as an additional hydraulic cylinder for dumping the bucket. The conventional rear mounted loaders described above require considerable structure for supporting the hydraulic cylinders and frequently require protrusions extending into the bucket which interferes with the normal operation of the bucket.

It is therefore a principal object of the invention to provide an improved rear mounted loader bucket for a tractor.

A further object of the invention is to provide a loader bucket which is mounted on the three-point hitch assembly at the rear end of a tractor wherein the same hydraulic cylinders used for dumping the bucket are also used to maintain the bucket in a level condition or a rolled-back position.

Yet another object of the invention is to provide a loader bucket which is mounted on the three-point hitch assembly at the rear of a tractor which does not have any protrusions located within the bucket itself.

Still another object of the invention is to provide a loader bucket of the type described which is easy to operate.

These and other objects will be apparent to those skilled in the art.

SUMMARY OF THE INVENTION

Figure 1:
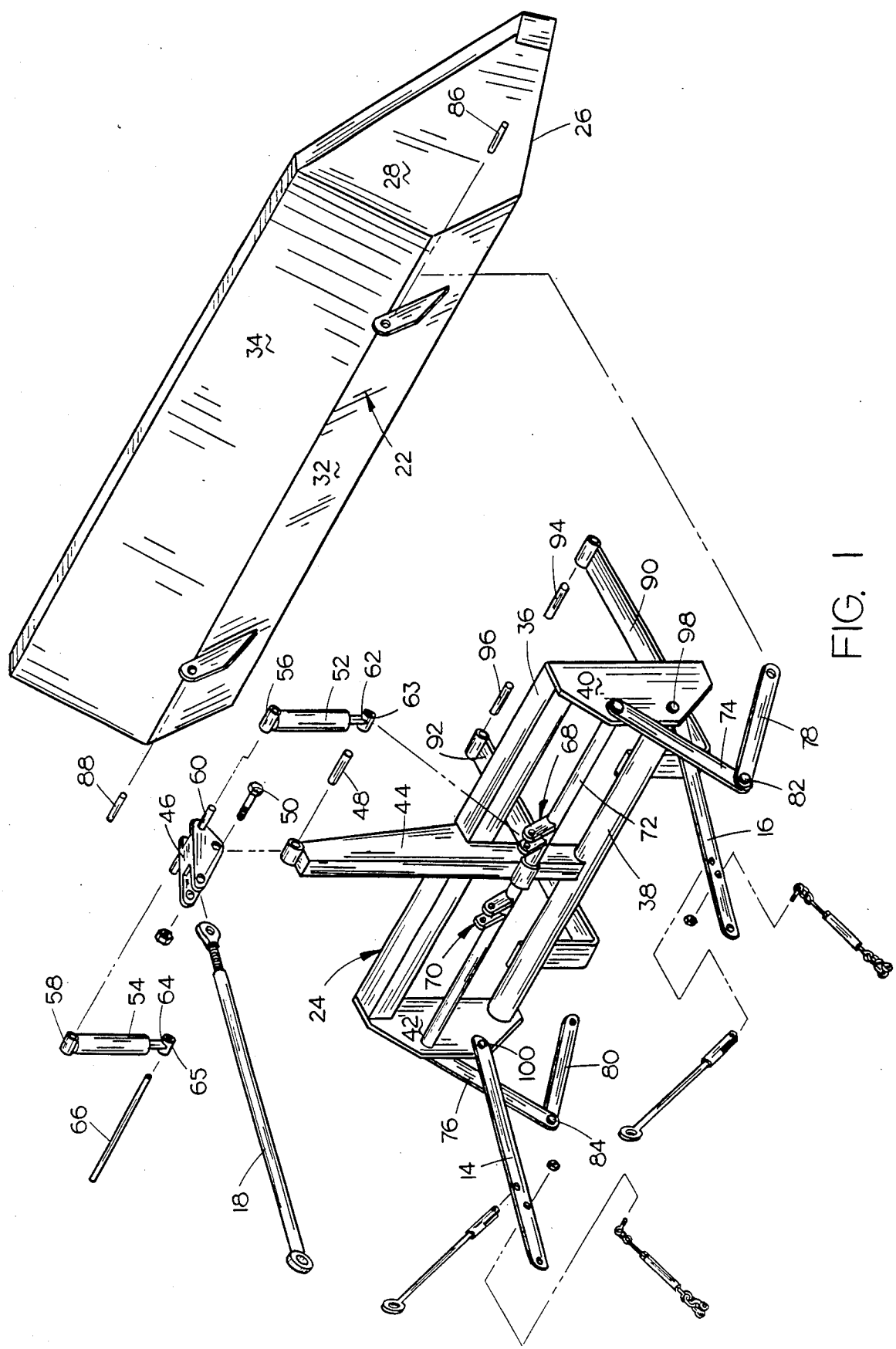
FIG. 1 is an exploded perspective view of the apparatus of this invention.

The loader bucket assembly of this invention includes a loader bucket having a bucket support frame mounted thereon which is connected to the three-point hitch assembly located at the rear of a conventional tractor. The frame includes a pair of vertically disposed and horizontally spaced-apart side frame members which are pivotally connected to the rearward ends of the lower link arms of the hitch assembly. The frame also includes a vertically disposed post having a bracket pivotally mounted at the upper end thereof. The forward end of the bracket is pivotally secured to the rearward end of the upper link arm of the hitch assembly. A pair of hydraulic cylinders are pivotally connected, at their base or cylinder ends, to the rearward end of the bracket and have their rod ends pivotally secured to brackets which are welded to a horizontally disposed shaft which is rotatably mounted on the frame. The loader bucket is pivotally mounted on the frame and is connected to the rotatable shaft by a linkage whereby extension and retraction of the hydraulic cylinders causes the bucket to be pivotally moved relative to the frame. When the hydraulic cylinders are in their retracted position, the loader frame and bucket are tipped back. When the hydraulic cylidners are partially extended, the loader frame and bucket are pivotally moved until the bottom of the bucket is parallel to the ground. When the hydraulic cylinders are fully extended, the loader bucket is pivotally moved relative to its frame to its dumping position.

DESCRIPTION OF THE PREFERRED EMBODIMENT

The numeral 10 refers generally to a conventional tractor having a three-point hitch assembly 12 mounted at the rearward end thereof. Hitch assembly 12 includes a pair of lower link arms 14 and 16 which are pivoted at their forward ends to the tractor and which are pivotally moved upwardly or downwardly by the tractor hitch control mechanism. Hitch assembly 12 also includes a length-adjustable upper link arm 18 which is pivoted at its forward end to the tractor 10.

The numeral 22 refers generally to the loader bucket assembly of this invention which is pivotally mounted on a bucket support frame means 24. Bucket 22 includes a bottom wall 26, side walls 28 and 30, and back wall portions 32 and 34.

Frame means 24 includes a horizontally disposed and vertically spaced upper and lower frame members 36 and 38 having side frame members 40 and 42 secured to the opposite ends thereof and extending therebetween. A vertically disposed post 44 is secured to the rearward sides of frame members 36 and 38 by welding and has its upper end disposed above frame member 36 as seen in the drawings. Bracket 46 is pivotally secured to the upper end of post 44 by pin 48. The forward end of bracket 46 is pivotally secured to the rearward end of upper link arm 18 by pin or bolt 50. Hydraulic cylinders 52 and 54 are positioned on opposite sides of post 44 and have their upper base ends 56 and 58 pivotally secured to the rearward end of bracket 46 by pin 60.

The lower rod ends 62 and 64 of hydraulic cylinders 52 and 54 are welded to collars 63 and 65 having shaft 66 extending therethrough which is rotatably mounted in brackets 68 and 70. The lower ends of brackets 68 and 70 are welded to shaft 72 which is rotatably mounted in and which extends between and beyond side frame members 40 and 42. Arms or links 74 and 76 are welded to the outer ends of shaft 72 for rotation therewith. Arms or links 78 and 80 are pivotally connected to the other ends of links 74 and 76 by bolts 82 and 84 respectively. The rearward ends of arms 78 and 80 are pivotally secured to the forward side of back wall portion 34 by pins or bolts 86 and 88 respectively.

Arms 90 and 92 are welded, at their forward ends, to frame member 38 and extend rearwardly therefrom. The rearward ends of arms 90 and 92 are pivotally secured to bottom wall 26 by bolts or pins 94 and 96 respectively. As seen in FIG. 1, the rearward ends of lower link arms 14 and 16 are pivotally secured to side frame members 42 and 40 respectively by means of pins or bolts 98 and 100.

Figure 2:
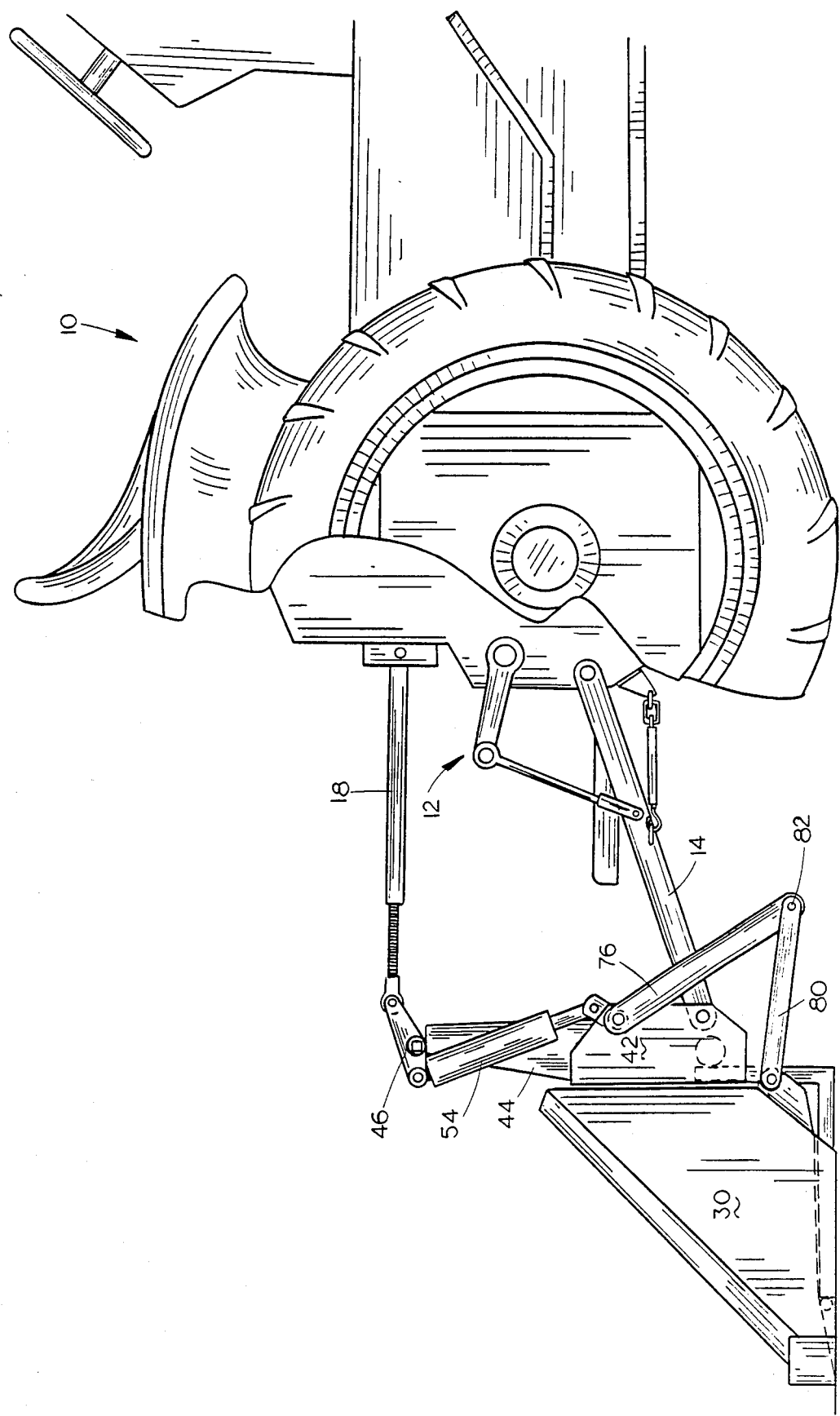
FIG. 2 is a side view of the apparatus with the bucket in its lowermost level position.
Figure 3:
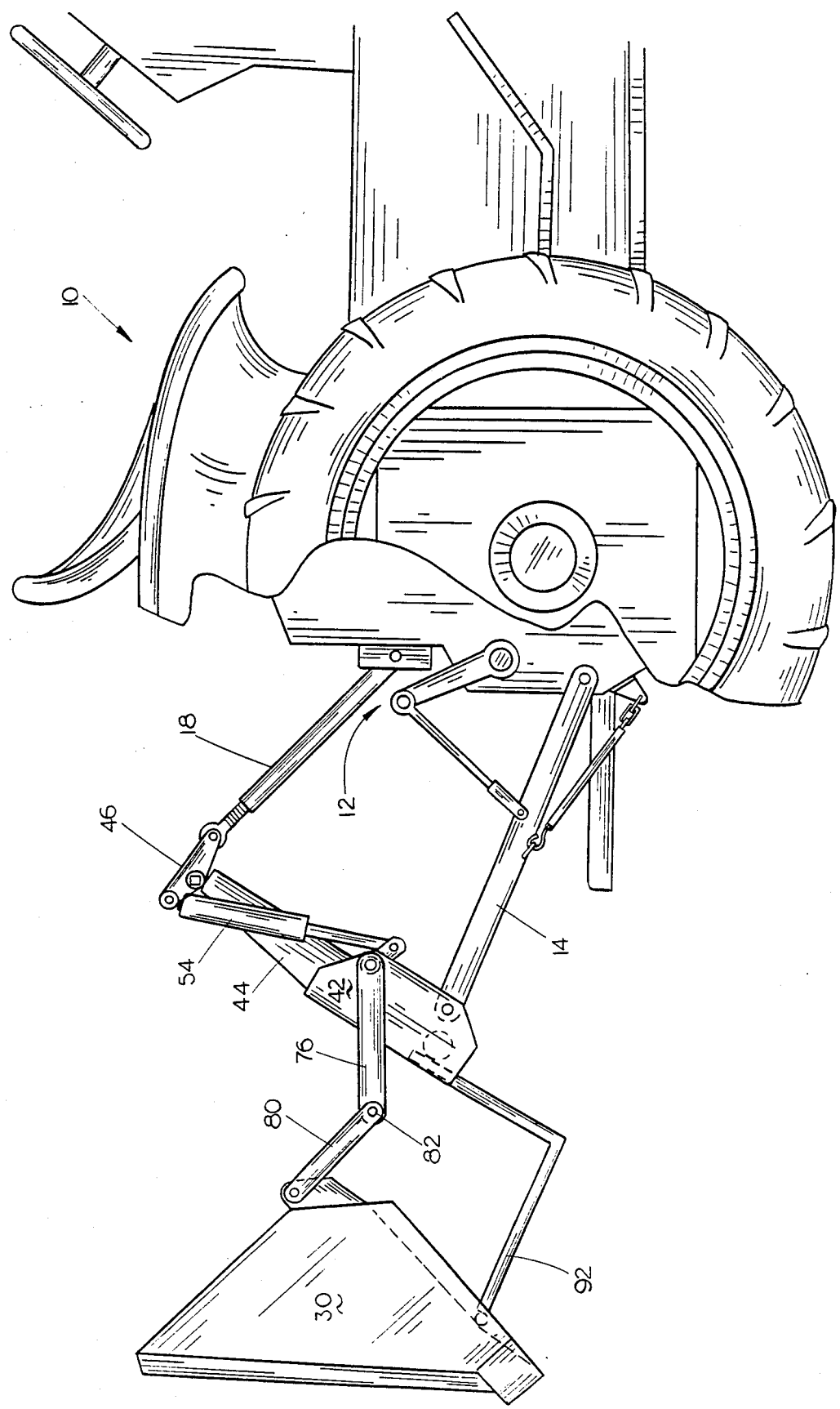
FIG. 3 is a side view illustrating the bucket in a dumped position.
Figure 4:
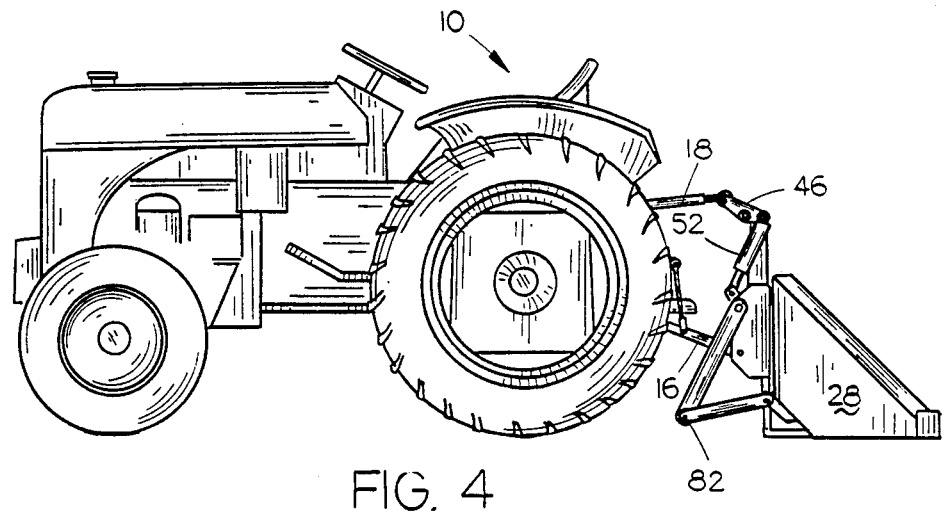
FIGS. 4–9 are side views illustrating the sequence of operation of the apparatus.
Figure 5:
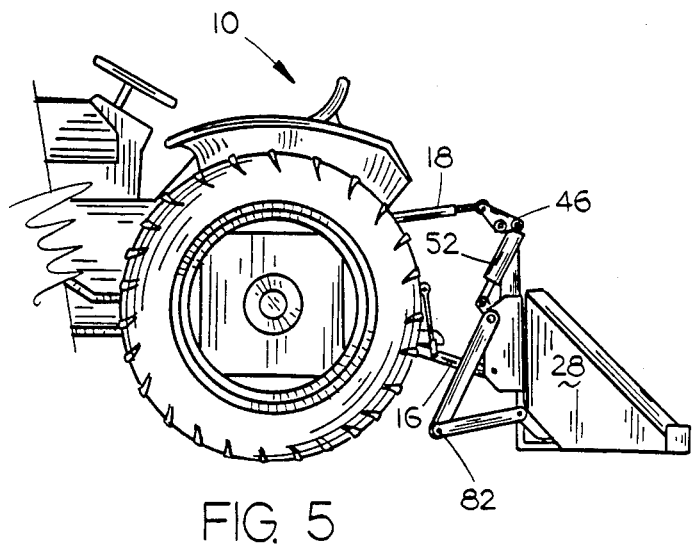
Figure 6:
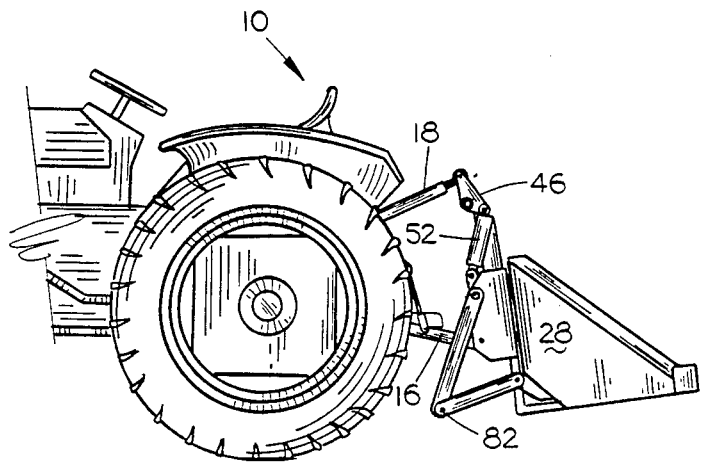
Figure 7:
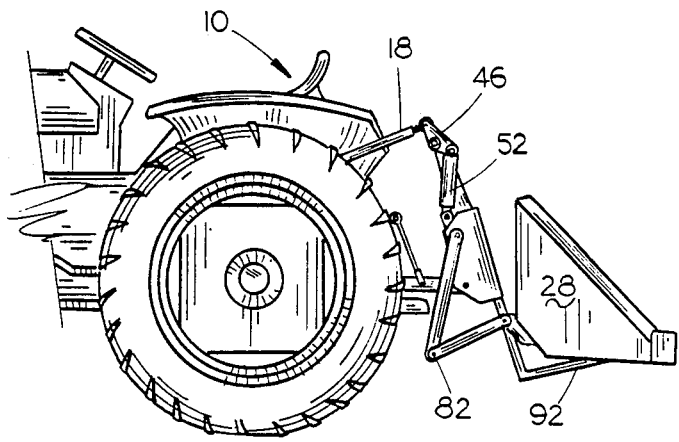

FIG. 2 illustrates the loader bucket 20 in its lowermost position. In the position of FIG. 2, the hydraulic cylinders 52 and 54 are in a partially extended position so that the bottom of the bucket 20 is parallel to the ground. When the hitch assembly 12 is actuated to move the bucket upwardly from the position of FIGS. 2 and 4, the hydraulic cylinders 52 and 54 may be further retracted which will cause the bucket 20 to be "rolled back" slightly so that material will not pass from the bucket. If it is desired to maintain the bucket in a level condition as it is being moved upwardly by the hitch assembly 12, hydraulic cylinders 52 and 54 are extended slightly which causes the shaft 72 to be rotated which in turn causes bucket 20 to be pivoted relative to its supporting structure so that it is in the level position as illustrated in FIG. 7.

Figure 8:
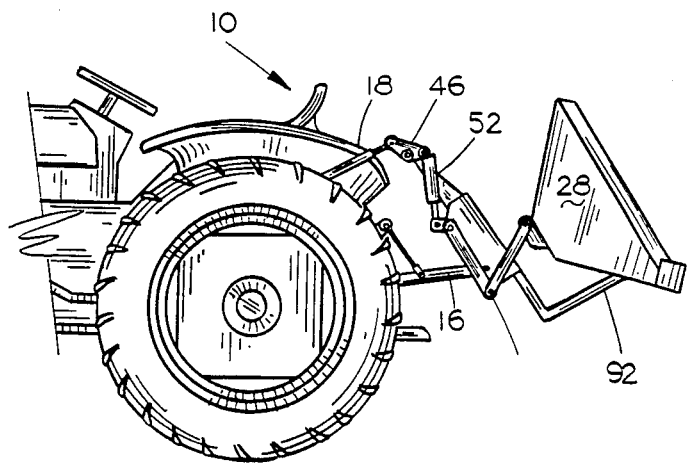
Figure 9:
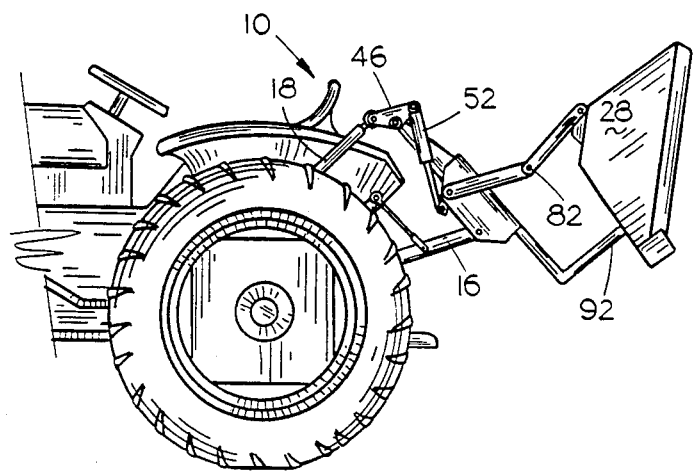
Figure 10:
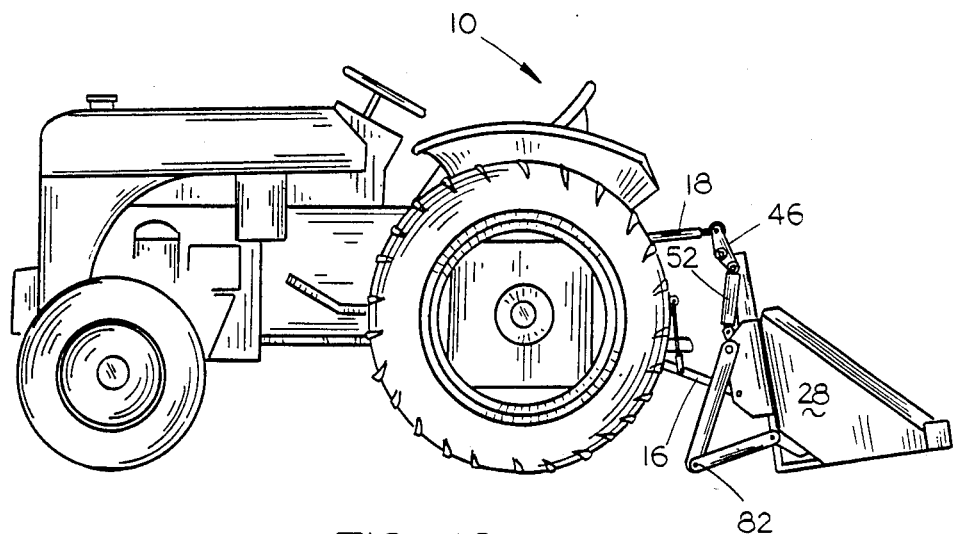
FIG. 10 is a side view illustrating the bucket in a lowered, tilted back position.

When it is desired to dump the bucket, hydraulic cylinders 52 and 54 are extended as illustrated in FIGS. 8 and 9 which causes shaft 72 to be rotated so that the links 74, 78 and 76, 80 are pivoted relative to each other to cause the bucket 20 to be pivotally moved to its dumping position. The bucket may be moved from its dumping position to a non-dumping position by simply retracting the cylinders 52 and 54.

Thus it can be seen that a novel rear-mounted loader bucket has been provided for a tractor which utilizes the same hydraulic cylinders for dumping the bucket and to maintain the bucket in a level condition or a rolled-back position. It can also be seen that the structural arrangement of the components of this invention eliminates the need for any protrusions located within the bucket itself. It can therefore be seen that the invention accomplishes at least all of its stated objectives.

We claim:

1. In combination,
   a tractor having a vertically movable three-point hitch assembly provided at the rearward end thereof,
   said hitch assembly being movable between upper and lower positions,
   said hitch assembly including first and second lower link arms and an upper link arm, said link arms having rearward and forward ends,
   a loader bucket support frame pivotally secured to said hitch assembly,
   a loader bucket pivotally mounted on said support frame and being pivotable from a tipped-back position relative to said support frame to a dumping position and to a position therebetween wherein the bottom of the bucket is substantially level,
   a linkage means connected to said loader bucket for pivotally moving said bucket about its pivotal mount on said support frame,
   and a hydraulic cylinder means operatively pivotally connected to said support frame, said upper link arm and said linkage means for pivoting said loader bucket between said tipped-back, level and dumping positions.

2. In combination,
   a tractor having a vertically movable three-point hitch assembly provided at the rearward end thereof,
   said hitch assembly being movable between upper and lower positions,
   said hitch assembly including first and second lower link arms and an upper link arm, said link arms having rearward and forward ends,
   a loader bucket support frame pivotally secured to said hitch assembly,
   a loader bucket pivotally mounted on said support frame and being movable from a tipped-back position relative to said support frame to a dumping position and to a position therebetween wherein the bottom of the bucket is substantially level,
   a linkage means connected to said loader bucket for pivotally moving said bucket about its pivotal mount on said support frame,
   a hydraulic cylinder means operatively pivotally connected to said support frame, said upper link arm and said linkage means for moving said loader bucket between said tipped-back, level and dumping positions,
   said support frame including a vertically disposed post means having upper and lower ends and a bracket means having rearward and forward ends,
   said bracket means being pivotally secured, between its rearward and forward ends, to said post means adjacent the upper end thereof, the forward end of said bracket means being pivotally secured to the rearward end of said upper link arm,
   said hydraulic cylinder means pivotally connected at the base end thereof to the rearward end of said bracket means, and
   a horizontally disposed shaft rotatably mounted on said frame, the rod end of said hydraulic cylinder means being operatively secured to said shaft whereby extension of the rod from said hydraulic cylinder causes said shaft to be rotated in a first direction and whereby retraction of the rod into said hydraulic cylinder means causes said shaft to be rotated in a direction opposite to said first direction,
   said shaft being connected to said linkage means whereby rotation of said shaft in said first direction causes said bucket to move towards its dumping position and whereby rotation of said shaft in said opposite direction causes said bucket to move towards a position wherein the bottom of the bucket is parallel to the ground and wherein further retraction causes the support frame and bucket to roll back.

3. The combination of claim 2 wherein said hydraulic cylinder means comprises a pair of hydraulic cylinders positioned on opposite sides of said post means.

4. The combination of claim 1 wherein the interior of said bucket is substantially protrusion free.

5. In combination,
   a tractor having a vertically movable three-point hitch assembly provided at the rearward end thereof,
   said hitch assembly being movable between upper and lower positions,
   said hitch assembly including first and second lower link arms and an upper link arm, said link arms having rearward and forward ends, a loader bucket support frame pivotally secured to said hitch assembly, said loader bucket support frame being pivotally movable from a tipped-back position to a second position, relative to said hitch assembly, a loader bucket pivotally mounted to said support frame and pivotable from a tipped-back position to a dumping position and to a position therebetween wherein the bottom of the bucket is substantially level, a hydraulic cylinder means operatively pivotally connected to said support frame, said upper link arm and said bucket, said hydraulic cylinder means being in a substantially retracted position when said support frame and said bucket are in their tipped-back positions, said hydraulic cylinder means being in a partially extended position when said bucket is in its level position and said support frame is in its second position, the continued extension of said hydraulic cylinder means causing said bucket means to move to its dumping position.

6. In combination, a tractor having a vertically movable three-point hitch assembly provided at the rearward end thereof, said hitch assembly being movable between upper and lower positions, said hitch assembly including first and second lower link arms and an upper link arm, said link arm having rearward and forward ends, a loader bucket support frame pivotally secured to said hitch assembly, said loader bucket support frame being pivotally movable from a tipped-back position to a second position, relative to said hitch assembly, a loader bucket pivotally mounted to said support frame and movable to a dumping position with respect to said support frame, a hydraulic cylinder means operatively pivotally connected to said support frame, said upper link arm and said bucket, said hydraulic cylinder means being in a substantially retracted position when said support frame and said bucket are in their tipped-back positions, said hydraulic cylinder means being in a partially extended position when said bucket is in its level position and said support frame is in its second position, the continued extension of said hydraulic cylinder means causing said bucket means to move to its dumping position, said support frame including a vertically disposed post means having upper and lower ends and a bracket means having rearward and forward ends, said bracket means being pivotally secured, between its rearward and forward ends, to said post means adjacent the upper end thereof, the forward end of said bracket means being pivotally secured to the rearward end of said upper link arm, said hydraulic cylinder means pivotally connected at the base end thereof of the rearward end of said bracket means, a horizontally disposed shaft rotatably mounted on said frame, the rod end of said hydraulic cylinder means being operatively secured to said shaft whereby extension of the rod from said hydraulic cylinder causes said shaft to be rotated in a first direction and whereby retraction of the rod into said hydraulic cylinder means causes said shaft to be rotated in a direction opposite to said first direction, said shaft being connected to said linkage means whereby rotation of said shaft in said first direction causes said bucket to move towards its dumping position and whereby rotation of said shaft in said opposite direction causes said bucket to move towards a position wherein the bottom of the bucket is parallel to the ground and wherein further retraction causes the support frame and bucket to roll back.

* * * * *